(12) United States Patent
Meilhan et al.

(10) Patent No.: US 12,252,920 B2
(45) Date of Patent: Mar. 18, 2025

(54) DEVICE FOR ASSISTING DOOR OPENING

(71) Applicant: Ratier-Figeac SAS, Figeac (FR)

(72) Inventors: Cédric Meilhan, Fourmagnac (FR); Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 101 days.

(21) Appl. No.: 17/708,076

(22) Filed: Mar. 30, 2022

(65) Prior Publication Data
US 2022/0316255 A1 Oct. 6, 2022

(30) Foreign Application Priority Data

Mar. 30, 2021 (EP) .................................... 21315058

(51) Int. Cl.
B64C 1/14 (2006.01)
E05F 3/04 (2006.01)
E05F 15/611 (2015.01)

(52) U.S. Cl.
CPC .......... *E05F 15/611* (2015.01); *B64C 1/1407* (2013.01); *E05F 3/04* (2013.01); *E05Y 2201/21* (2013.01); *E05Y 2201/254* (2013.01); *E05Y 2201/434* (2013.01); *E05Y 2201/686* (2013.01); *E05Y 2201/706* (2013.01); *E05Y 2400/36* (2013.01); *E05Y 2400/44* (2013.01); *E05Y 2600/41* (2013.01); *E05Y 2900/502* (2013.01)

(58) Field of Classification Search
CPC .............................. B64C 1/1407; B64C 1/1423
See application file for complete search history.

(56) References Cited

U.S. PATENT DOCUMENTS

| 4,176,812 | A |   | 12/1979 | Baker |           |
|-----------|---|---|---------|-------|-----------|
| 4,473,201 | A | * | 9/1984  | Barnes | B64C 1/1415 |
|           |   |   |         |       | 292/216   |
| 4,510,714 | A | * | 4/1985  | Kasper | B64C 1/1415 |
|           |   |   |         |       | 49/249    |

(Continued)

FOREIGN PATENT DOCUMENTS

| EP | 1835109 A2 * | 9/2007 | ............ E05F 1/1091 |
| WO | WO-03036008 A1 * | 5/2003 | ............ E05F 15/614 |

OTHER PUBLICATIONS

Wikipedia, Linear Actuator, Apr. 17, 2020, [web.archive.org/web/20200417113741/https://en.wikipedia.org/wiki/Linear_actuator] (Year: 2020).*

(Continued)

*Primary Examiner* — Tye William Abell
*Assistant Examiner* — Justin Michael Heston
(74) *Attorney, Agent, or Firm* — CANTOR COLBURN LLP

(57) ABSTRACT

A device for assisting the opening and closing of a door in a structure. The device may comprise: a door shaft configured to rotate about a longitudinal axis thereof in both a first direction and in a second opposite direction, and configured to be mounted to the structure to form a hinge about which the door may rotate in the both the first and second directions relative to the structure; a first actuator linked to the door shaft and configured to control a speed of rotation of the door shaft in the first direction; and a second actuator linked to the door shaft and configured to drive rotation of the door shaft in the second direction. The second actuator is an electromechanical actuator.

12 Claims, 6 Drawing Sheets

(56) References Cited

U.S. PATENT DOCUMENTS

| | | | | |
|---|---|---|---|---|
| 6,457,675 | B1* | 10/2002 | Plude | B64C 1/1415 |
| | | | | 49/276 |
| 9,033,277 | B2 | 5/2015 | Berthoud | |
| 9,234,378 | B2* | 1/2016 | Hansen | E05F 15/63 |
| 9,651,951 | B2* | 5/2017 | De La Bardonnie | G05D 3/00 |
| 9,969,482 | B2 | 5/2018 | Prouzet et al. | |
| 10,207,818 | B2* | 2/2019 | Besettes | B64D 47/08 |
| 2020/0270926 | A1 | 8/2020 | Tendyra et al. | |
| 2021/0123278 | A1* | 4/2021 | Chambers | E05D 15/248 |

OTHER PUBLICATIONS

European Search Report for Application No. 21315058.4, mailed Sep. 16, 2021, 8 pages.
European (EPO) Official Letter for Application No. 21315058.4, mailed Mar. 12, 2024, 6 pages.

* cited by examiner

DEVICE FOR ASSISTING DOOR OPENING

CROSS-REFERENCE TO RELATED APPLICATIONS

This application claims priority to European Patent Application No. 21315058.4 filed Mar. 30, 2021, the entire contents of which is incorporated herein by reference.

TECHNICAL FIELD

The present disclosure relates to a device for assisting the opening and or closing of doors such as, for example, aircraft doors.

BACKGROUND

Doors which can open and/or close about a hinge are used in many different applications. For example, doors which open or close under the effect of gravity or their weight are known in various applications such as for example, for use in aircraft. In aircraft, doors of this type may include both emergency exit doors which open upwardly and passenger doors which open downwardly to form a staircase for exit from the aircraft.

Various devices and mechanisms to aid in opening and closing such doors are known in the art. These devices typically comprise an electrical actuator which controls the opening and closing of the door. In the event of failure of the electrical actuator therefore, an aircraft door may fall at uncontrolled speed, potentially causing injury to bystanders or damage to the aircraft and surrounding objects.

U.S. Pat. No. 9,969,482 B2 discloses an aircraft door and a device for assisting the operation thereof. The device comprises a tubular body, a piston sliding inside the tubular body and defining a working chamber filled with hydraulic fluid and an accumulator comprising a compensation chamber filled with hydraulic fluid and in communication with the working chamber, and a chamber filled with pressurised gas.

The device of U.S. Pat. No. 9,969,482 B2 may be used together with a motorised pulley and a connecting cable to assist with the opening and closing of an aircraft door.

Although various devices for assisting door opening are known, there is a need for improved devices for assisting door opening and/or closing.

SUMMARY

According to a first aspect of the disclosure, there is provided a device for assisting the opening and closing of a door in a structure, the device comprising of a door shaft configured to rotate about a longitudinal axis thereof in a first direction and in a second opposite direction, and configured to be mounted to the structure to form a hinge about which the door may rotate in both the first and second directions relative to the structure; a first actuator linked to the door shaft and configured to control a speed of rotation of the door shaft in the first direction; and a second actuator linked to the door shaft and configured to drive rotation of the door shaft in the second direction, wherein the second actuator is an electromechanical actuator.

It will be understood that this device provides a relatively simple and compact means for assisting in opening and closing a door. This may be particularly beneficial in applications where space is limited and/or where the weight of any components should be minimised such as, for example, in aerospace applications. Further, as both the first and second actuators are linked to the door shaft, no additional components such as cables and/or pulleys extending between a door and a structure are required for the device to act to open and/or close a door.

In any example of the disclosure, the first actuator may comprise a hydraulic actuator and may comprise a damping system for controlling the speed of rotation of the door shaft in the first direction.

In any example of the disclosure, the hydraulic actuator may further comprise an accumulator for storing at least one of potential energy of the door and energy generated while the door is moving in the first direction.

The accumulator may comprise a pre-pressurised gas in a chamber and may be adapted to store energy by further pressurising the gas due to rotation of the door shaft in the first direction.

The hydraulic actuator may be configured to assist in driving rotation of the door shaft in the second direction using the energy stored by the accumulator.

In any example of the disclosure, the second actuator may further be configured to control the speed of rotation of the door shaft in the first direction.

The device may further be configured such that one of the first actuator and the second actuator will function to control the speed of rotation of the door shaft in the first direction in the event of a failure of the other of the first actuator and the second actuator.

In any example of the disclosure, the device may further comprise a controller adapted to control the second actuator to control the speed of rotation of the door shaft.

The device may further comprise a sensor for sensing the extent of rotation of the door shaft and/or the extent of opening of the door, the controller being adapted to control the second actuator to control the speed of rotation of the door shaft based on the extent of rotation of the door shaft and/or the extent of opening of the door.

The sensor may take any suitable form and may be provided in any suitable location to sense the extent of rotation of the door shaft. Thus, one or more sensors may be provided on the door shaft, and/or in the first and/or the second actuator, and/or connected to the door.

In any example of the disclosure, the second actuator may comprise a linear electromechanical actuator or a rotary electromechanical actuator.

From a further aspect of the disclosure, a door comprising a device according to any example of the disclosure is provided, wherein the door further comprises a door panel connected to the door shaft for rotation therewith such that the door panel is configured to rotate between an open position and a closed position.

In any example of the disclosure, the weight of the door may act to rotate the door shaft in the first direction.

In any example of the disclosure, the device may be adapted to activate and/or control the second actuator to control the speed of movement of the door towards the end of its travel in the first direction, and/or to control the second actuator to control the speed of movement of the door towards the end of its travel in the second direction.

In any example of the disclosure, the door may be an aircraft door and the structure may be an aircraft.

From a still further aspect of the disclosure, an aircraft is provided, the aircraft comprising: a door according to any example of the disclosure; and an aircraft body having an opening housing the door, wherein the first actuator and the second actuator are fixed to the aircraft body, and wherein rotation of the door shaft causes the door to move between a closed position in which it closes the opening and an open position in which the opening is not closed by the door.

In any example of the disclosure, the aircraft may further comprise a floor within the body, wherein the device is located under the floor in the aircraft.

BRIEF DESCRIPTION OF DRAWINGS

An example of the disclosure will now be described by way of example only and with reference to the accompanying drawings in which.

DETAILED DESCRIPTION

Figure 1:
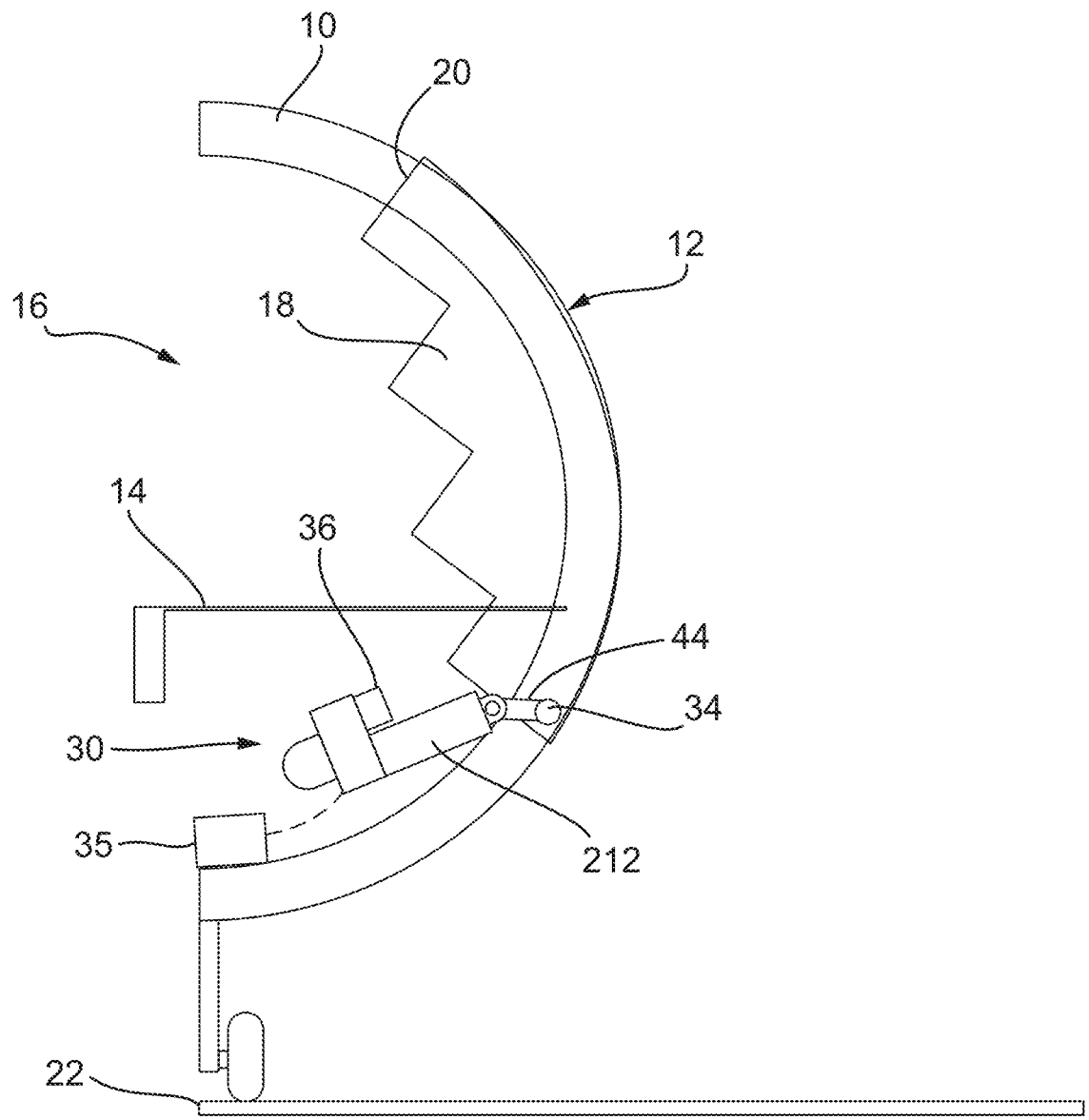
FIG. 1 shows a schematic cross section through part of an aircraft and aircraft door when the door is in the closed position.

FIG. 1 is a schematic cross sectional view through a part of an aircraft fuselage 10 showing a door in which a device according to the disclosure may be used. It will be understood that a device according to the disclosure could be used with many different types of doors in many different structures. In the example of the disclosure as shown in the drawings and discussed below, the device is used with a door in an aircraft.

In FIG. 1, an aircraft door 12 is shown in a first closed position. The door 12 is provided in an opening (not shown) in the aircraft fuselage 10. The door 12 is of a type typically used in passenger aircraft and is configured to be opened by rotating outwardly and downwardly to open in a first direction. The door 12 can be closed by being rotated upwardly in a second direction. It will be understood that, although not shown, the device according to the disclosure could be used in doors for entities other than aircraft and in doors which open by rotating in another direction, for example, upwardly or which rotate about a vertical axis. Thus, the first and second directions are not limited to the downward and upward directions of the example shown.

The door 12 is configured to rotate about an axis (not shown) provided below the floor 14 of a cabin 16 within the aircraft. The axis of rotation of the door 12 typically extends in a substantially horizontal direction. Stairs 18 may be provided within the door 12.

As seen in FIG. 1, when the door 12 is fully closed, it is substantially aligned with the aircraft fuselage 10 so as to close the opening therein and the stairs 18 are stored internally of the aircraft.

Figure 2:
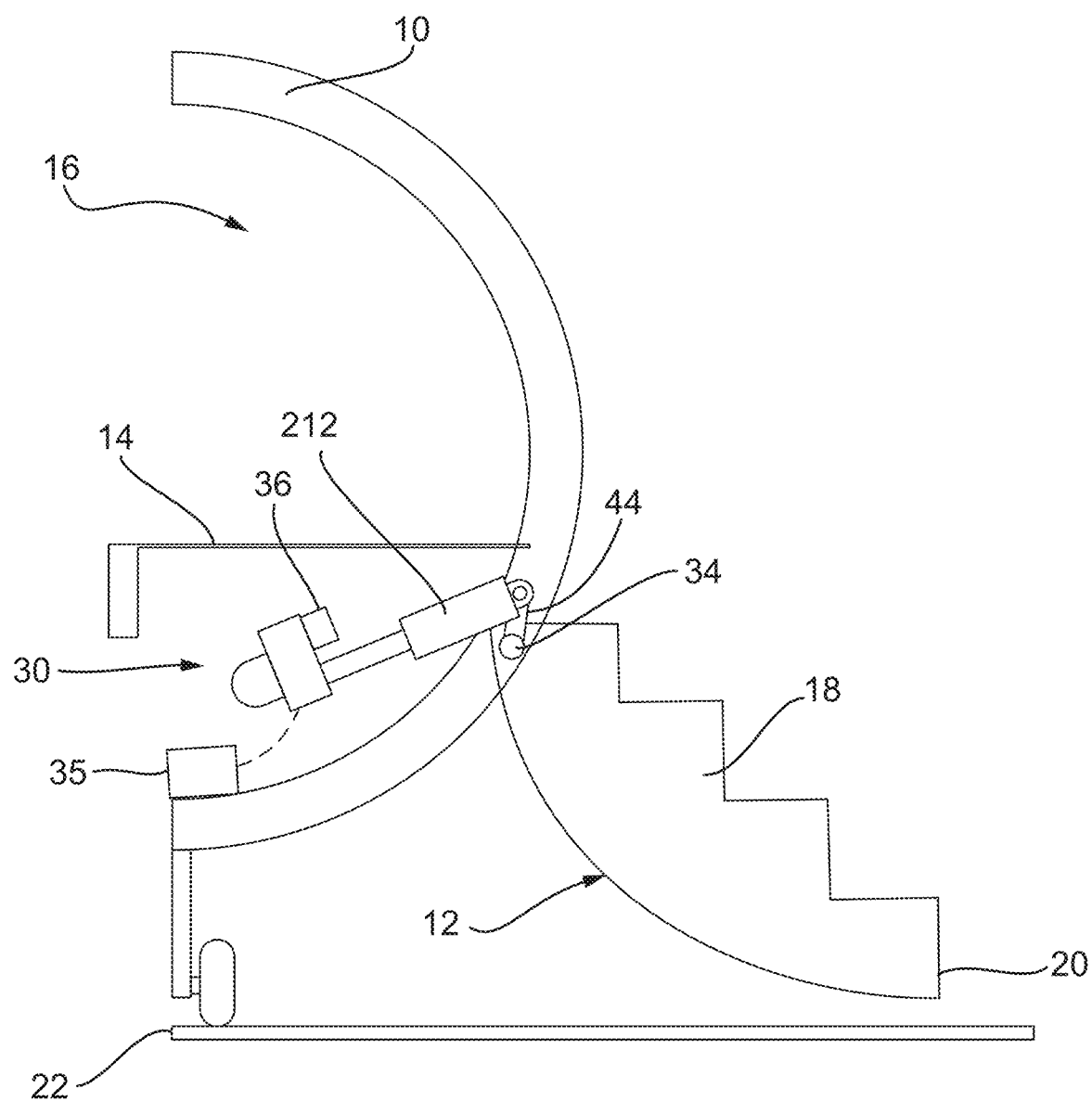
FIG. 2 shows the part of the aircraft and aircraft door of FIG. 1 when the door is in the open position.

FIG. 2 is a schematic cross sectional view through a part of an aircraft fuselage 10 showing the door 12 in a second, open position. When the door 12 is in the fully open position, the stairs 18 are positioned such that passengers can use the stairs to enter or exit the cabin 16 of the aircraft.

It will be appreciated that the door 12 can be stored in a first orientation in the fully closed position in which the stairs extend substantially vertically internally of the aircraft. The door 12 can rotate downwardly from the first orientation through an angle in a range of between about 90° and about 170° or in a range of between about 110° and about 150° to a fully open position in which the outer end 20 of the door 12 may contact or almost contact the ground 22 when the aircraft is at rest on the ground 22. It will be understood that, where necessary, the door 12 may be configured to rotate through an angle of more than 170° or less than 90° from the closed to the open position.

When in the closed position, the door 12 may be held in place by a latch mechanism (not shown). This can be released manually or by an automated system to open the aircraft door 12.

A device 30 for assisting the opening and closing of the aircraft door 12 is provided and can be seen in part in FIGS. 1 and 2. As shown, the device 30 may be provided under the floor 14 of the aircraft cabin 16.

Figure 3:
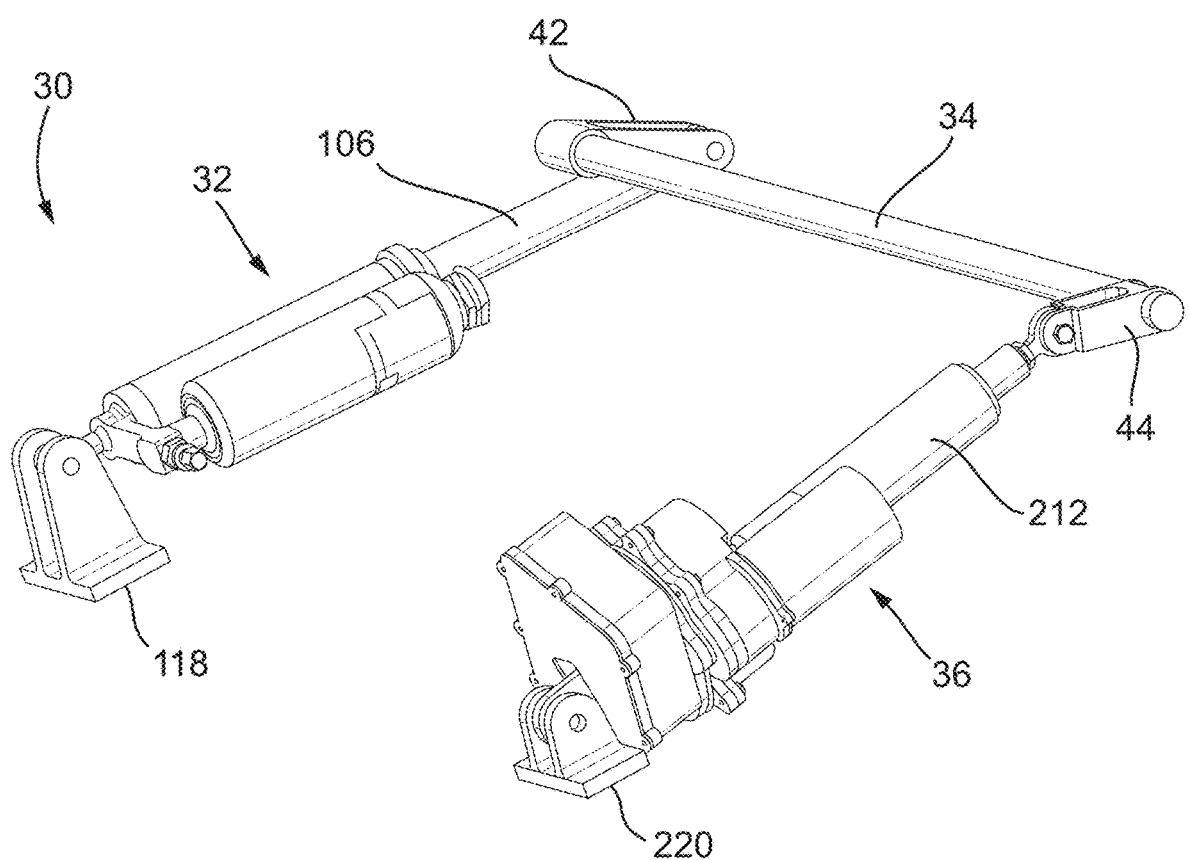
FIG. 3 is a perspective view of a device according to the disclosure when in a first position.
Figure 4:
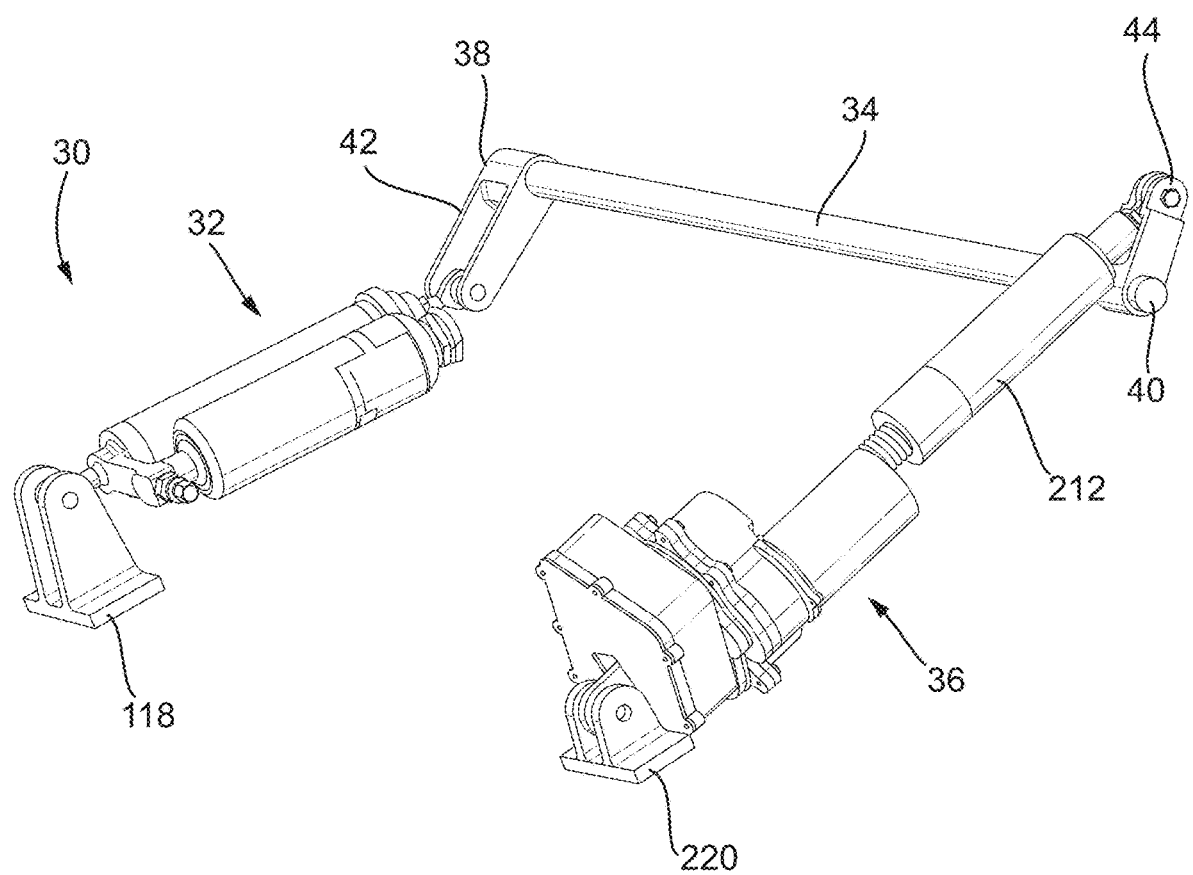
FIG. 4 is a perspective view of the device of FIG. 3 when in a second position.

The device 30 is shown in greater detail in FIGS. 3 and 4. In FIG. 3, the device 30 is in a first position corresponding to the aircraft door 12 being fully closed. In FIG. 4, the device 30 is in a second position corresponding to the aircraft door 12 being fully open.

As seen in FIG. 3, the device 30 comprises two actuators which may function independently of each other. In the example shown in FIGS. 3 and 4, the device 30 comprises a first actuator 32, linked to a door shaft 34 at a first distance along the shaft and a second electromechanical actuator 36, linked to the door shaft 34 at a second distance along the shaft, spaced along the shaft from the first actuator 32. The second actuator 36 is an electromechanical actuator.

The first actuator may be passive and is configured to control the speed of movement of the door 12 in the first direction, for example as the door 12 moves under the effect of its own weight. The first actuator may further be configured to store and provide an aiding force to assist in driving rotation of the door 12 in the second direction. In examples in which the door moves in the first direction under the effect of its own weight, the first actuator may be configured to at least partially compensate for the weight of the door.

The second actuator may be active. The second actuator may be configured to provide force & speed to move the door 12 in the second direction. The second actuator may further be configured to control the speed of movement of the door 12 in the first direction, for example if a failure of the first actuator makes this necessary or if a combined action of both the first and second actuators is required to control the speed of movement of the door 12.

In various examples of the disclosure, each of the first 32 and second 36 actuators may be rotary or linear actuators. In various examples of the disclosure, the first actuator 32 may be any of a hydraulic actuator, a pneumatic actuator or an electromechanical actuator.

In the example shown in FIGS. 3 and 4, the first actuator 32 comprises a linear hydraulic actuator 32 and the second actuator 36 comprises a linear electromechanical actuator 36. As described further below, the first and second actuators 32, 26 are linked to the door shaft 34 at or adjacent to the respective first 38 and second 40 ends thereof. In alternative examples however, the first and second actuators 32, 26 may be linked to the door shaft 34 at any desired location along the door shaft 34 and relative to each other. As will be described further below with reference to FIGS. 5 and 6, the first and second actuators 32, 36 are also fixed to the aircraft fuselage 10.

As seen in FIGS. 1 and 2, the door shaft 34 extends through the door 12 such that the longitudinal axis (not shown) of the door shaft 34 is coaxial with the axis of rotation (not shown) of the door 12. The door shaft 34 typically extends approximately horizontally or approximately parallel to the floor 14 of the aircraft cabin 16. It will be understood that approximately is intended to mean within + or −5°. In the example shown, the door shaft 34 may be approximately aligned with the central longitudinal axis of the aircraft fuselage.

The door shaft 34 is fixed to the door 12 such that the door 12 will rotate with the door shaft 34. Further, the door shaft 34 is rotatably fixed to the aircraft fuselage 10 so as to form a hinge about which the door 12 may rotate in both a first and a second direction relative to the aircraft fuselage 10. The door shaft 34 may be mounted on one or more bearings so as to reduce wear and/or friction.

In some examples, the device 30 further comprises or is connected to a controller and/or a power supply 35 as will be described further below.

To open the aircraft door 12, the door 12 is released and will then open outwardly (by rotating downwardly) under its own weight (i.e. the weight of the door). This may be achieved either manually or automatically, for example, via the controller 35. For safety reasons, it is desirable that the door 12 may open quickly. Due to the weight of the door 12 and the action of gravity however, it is desirable to be able to control and/or slow down the speed of opening of the door 12 so as to avoid possible injuries to people on the ground near the aircraft or damage to the door mechanism or aircraft structure. In various examples of the disclosure, either one or both of the first and second actuators 32, 36 may be used to control the speed of opening of the door 12. In the example shown, during normal operation, the first actuator 32 may be used to control the speed of movement of the door 12 (or to damp the movement of the door 12) while it is opening and the second actuator 36 may be passive, following the rotation of the door shaft 34 without exerting any significant force thereon.

In any example of the disclosure, a position sensor (not shown) may be provided to sense the extent of rotation of the door shaft 34, thus indicating the position of the door 12 or the extent of travel of the door 12 between the open and closed positions. The sensor may take any suitable form and may be provided in any suitable location to sense the extent of rotation of the door shaft 34. Thus, one or more sensors may be provided at one or more of the following locations: on the door shaft 34; and/or in the first and/or the second actuator 32, 36; and/or connected to the door 12.

The opening speed of the door 12 can be controlled in any example of the disclosure as a function of the door position. Further, the extent of rotation of the door shaft 34 can be used to optimize and/or adjust the control of the opening speed of the door 12.

In one example of the disclosure, when the position sensor senses that the door 12 is near to but not at the fully open position, for example, when the door 12 has rotated to about 10° from its fully open position, the controller 35 may activate or control the electromechanical actuator 36. The speed of rotation of the door 12 over the final extent of opening (for example, over the last 10° of rotation) may therefore be regulated by the electromechanical actuator 36 acting together with the hydraulic actuator 32. In one example, the phases of the motor(s) of the electromechanical actuator 36 can be short circuited. In another example, adequate active switching of the motor phases may be used to control the speed of rotation of the door 12 to a target value.

It will be understood that the additional control in the speed of rotation of the door 12 over the final extent of opening may slow the speed of movement of the door 12 to allow the door to gradually slow down as it reaches the fully open position such that the door will come to a smooth stop as it opens. This will further reduce the likelihood of damage to the aircraft, the door 12 or the door mechanism due, for example, to the door 12 contacting the ground 22 at too great a speed.

Further, it will be understood that in alternative examples, the controller 35 may control the electromechanical actuator 36 when already active so as to control the speed of rotation of the door 12 (for example, over the last 10° of rotation).

In any example of the disclosure, the hydraulic actuator 32 may include an accumulator 129 or gas spring mechanism (as will be described further below). The accumulator 129 may be precharged to have a level of stored potential energy when the door 12 is in the closed position and to store additional energy from the weight of the door 12 whilst the door is opening. In normal operation, when an operator wishes to close the door 12, the controller 35 will activate the electromechanical actuator 36 which will act to rotate the door shaft 34 and lift the door 12 back into the closed position. The hydraulic actuator 32 may assist the electromechanical actuator 36 using the energy stored by the accumulator 129. The level of stored potential energy when the door 12 is in the closed position may be set to provide a desired force to compensate, at least partially, for the weight of the door 12 and so to reduce the work required from the electromechanical actuator 36 while the door 12 is closing. The precharge of the accumulator 129 is further set at a level to allow the hydraulic actuator 32 to at least partially compensate for the weight of the door 12 in its open position and over the full extent of travel of the door 12 when closing.

The speed of rotation of the door 12 whilst closing may be controlled by the electromechanical actuator 36. When the position sensor (not shown) senses that the door 12 is near to but not at the fully closed position, for example when the door has rotated to about 10° from its fully closed position, the controller 35 may control the electromechanical actuator 36 (for example, switching to a different speed schedule) such that the speed of rotation of the door 12 over the final extent of closing (for example, over the last 10° of rotation) may be regulated to ensure that the door 12 does not close too quickly, potentially causing damage to the aircraft and/or people in the cabin 16.

The device 30 according to the disclosure may provide additional safety in the event of a failure of either the hydraulic actuator 32 or the electromechanical actuator 36. In the event that the hydraulic actuator 32 fails either before or during opening of the door 12, the controller 35 may receive notification of the failure. In one example of the disclosure, a failure of the hydraulic actuator 32 may be identified by monitoring the speed of movement of the electromechanical actuator 36 (for example, at the ball screw 206 or at the gear box 208). If an overspeed in the speed of movement of the electromechanical actuator 36 is detected, a signal error may be sent to controller 35. As a result of receiving the signal error, the controller 35 may activate or control the electromechanical actuator 36, which may be sized to sufficiently control the speed of rotation or movement of the door 12 when acting independently of and without the hydraulic actuator 32. Thus, the door 12 may be opened safely and at a controlled speed due to the action of the electromechanical actuator 36 when the hydraulic actuator 32 is not operational due to a failure thereof.

In one example of the disclosure, the electrical motor 202 in the electromechanical actuator 36 may be short-circuited to reduce the door opening speed as much as possible over the stroke of the electromechanical actuator 36.

In the event that the electromechanical actuator 36 fails either before or during opening of the door 12, the controller 35 may receive notification of the failure. In one example of the disclosure, a failure of the electromechanical actuator 36 during opening of the door 12 may be identified by monitoring the current/voltage at an electromechanical actuator motor control unit (not shown). During normal opening of the door 12, the electromechanical actuator 36 is passive and so the motor 202 will generate current/voltage. Thus, if no current/voltage is detected or if it is below a pre-set threshold, a signal identifying a failure of the electromechanical actuator 36 may be generated. The hydraulic actuator 32 may be sized to sufficiently control the speed of rotation or movement of the door 12 when acting independently of and without the electromechanical actuator 36. Thus, the door 12 may be opened safely and at a controlled speed due to the action of the hydraulic actuator 32 when the electromechanical actuator 36 is not operational due to a failure thereof.

The device 30 according to the disclosure may also provide additional safety in the event of a failure of either the hydraulic actuator 32 or the electromechanical actuator 36 when the door 12 is already open. In the event that the hydraulic actuator 32 has failed, the door 12 may remain open when an operator attempts to close the door. The electromechanical actuator 36 will detect an overload when activated to lift the door 12 due to a lack of assistance from the gas spring mechanism of the hydraulic actuator 32. Thus, the door 12 will remain open, indicating to personnel that there is a fault.

In the example shown, in the event that the electromechanical actuator 36 has failed, the door 12 will remain open when an operator attempts to close the door. The hydraulic actuator 32 is not sized to be capable of lifting the door 12 independently of the electromechanical actuator 36. Thus the door will remain open, indicating to personnel that there is a fault.

Figure 5:
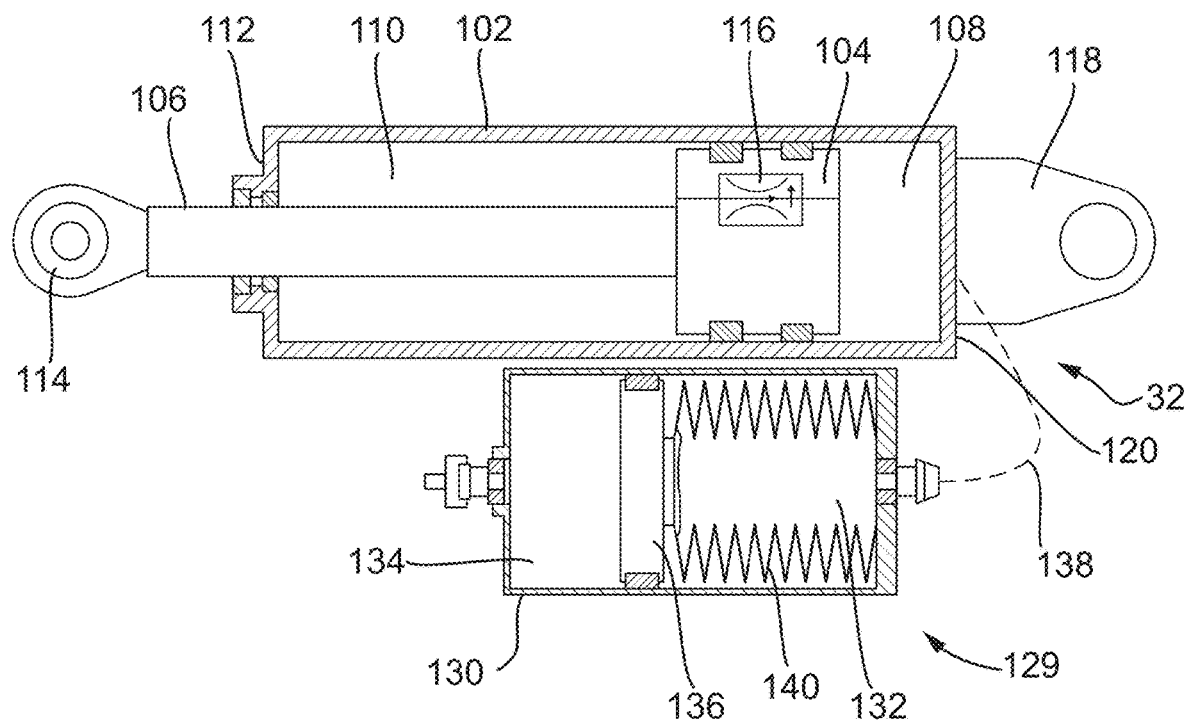
FIG. 5 shows a schematic cross section through an example hydraulic actuator for use in a device according to the disclosure.

An example hydraulic actuator 32 of the device 30 according to the disclosure is shown in greater detail in FIG. 5. In one example of the disclosure, the hydraulic actuator 32 may comprise a first cylinder 102 containing a piston 104 attached to a piston rod 106 at a first end of the piston rod 106. The piston rod 106 extends outwardly from a first end 112 of the first cylinder 102 and is provided with first fastening means 114 at the opposite second end thereof. The piston rod may be linked to the door shaft 34 via the first fastening means 114 and a linkage 42 connecting the door shaft 34 to the first fastening means 114 such that the door shaft 34 can pivot about the connection between the first fastening means 114 and the linkage 42.

The piston 104 is adapted to move axially within the first cylinder 102. The first cylinder 102 is separated into a first variable chamber 108 defined on a first side of the piston 104 and a second variable chamber 110 through which the piston rod 106 extends, the second chamber being defined on a second side of the piston 104. It will be understood that the first variable chamber 108 is circular in cross section and has a constant cross sectional area which is greater than the (constant) cross sectional area of the second variable chamber 110, which is annular in cross section due to the presence of the piston rod 106 in the second variable chamber 110.

This difference in the cross sectional areas of the first and second variable chambers 108, 110, allows the hydraulic actuator to develop a force when the accumulator (described below) is pressurized so as to allow for compensation of the weight of the door 12.

The free space inside the first cylinder 102, i.e. both the first and second chambers 108, 110, is filled with hydraulic fluid (not shown). In one example, the hydraulic fluid may be oil.

A damping system, for example, a choke valve 116 is provided within the piston 104 and extending from the first variable chamber 108 to the second variable chamber 110.

Second fastening means 118 are provided on the first cylinder 102 adjacent a second end 120 thereof. The hydraulic actuator 32 may be fixed to the aircraft, for example the aircraft fuselage, at a desired location via the second fastening means 118.

In addition, an accumulator for storing energy is provided. The accumulator comprises a second cylinder 130 separated into first and second variable chambers 132, 134 by a piston 136. The first variable chamber 132 of the second cylinder 130 is linked by a pipe 138 to the second variable chamber 110 of the first cylinder 102 such that hydraulic fluid may flow from the second variable chamber 110 of the first cylinder 102 into the first variable chamber 132 of the second cylinder 130.

The first variable chamber 132 of the second cylinder 130 contains a gas-tight metal bellows 140 into which the hydraulic fluid may flow. In alternative examples, a bellows formed from an elastomeric or natural rubber membrane may be provided. The second variable chamber 134 of the second cylinder 130 is filled with a gas which can be compressed and pressurised by the action of the piston 136 moving within the second cylinder 130 as hydraulic fluid flows into the first variable chamber 132 of the second cylinder 130 due to movement of the piston 104 of the first cylinder 102. In the example shown, an initial pressure is applied to the gas in the second variable chamber 134 such that the gas is at the initial pressure or a higher pressure at all times. Thus, the accumulator is precharged to have a level of stored energy when the door 12 is in the closed position. As the gas can be compressed and pressurised by the action of the piston 136 moving within the second cylinder 130, the pressurised gas can also act to store energy generated as the door is opening and to use the stored energy in assisting closing of the door. The accumulator is therefore configured to supply a static effort to the piston 104 of the hydraulic actuator to compensate for the weight of the door acting in the first direction and to assist in closing the door, to move it in the second direction, due to the energy stored in the pressurised gas.

Figure 6:
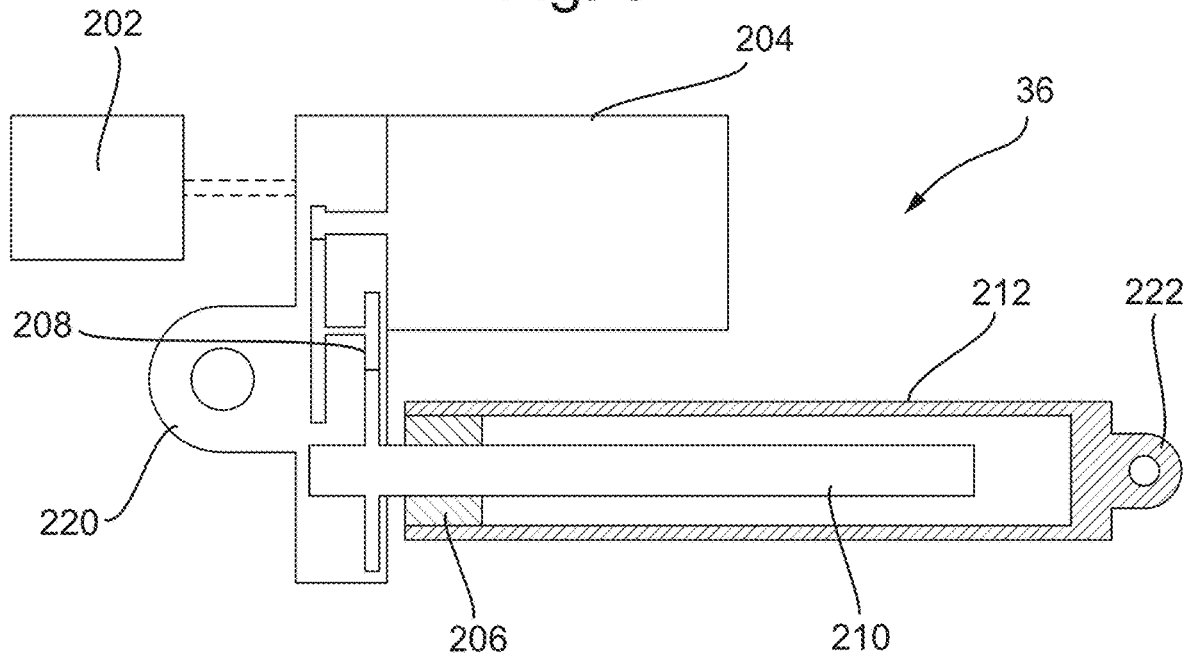
FIG. 6 shows a schematic cross section through an example electromechanical actuator for use in a device according to the disclosure.

An example electromechanical actuator 36 of the device according to the disclosure is shown in greater detail in FIG. 6. The electromechanical actuator 36 includes an electric motor control unit (EMCU) 202 which controls an A/C electrical motor 204. The electrical motor 204 is configured to drive a ball screw assembly 206 via gears 208 so as to convert rotational movement of the motor 204 into linear movement. A cylindrical body or arm 212 extends over the screw 210 and is threaded as to engage with the screw and to move linearly relative to the screw in use so as to be capable of being axially extended or retracted.

First fastening means 220 for fastening the electromechanical actuator 36 to a stationary part of the aircraft are provided adjacent the electrical motor 204 and gears 208. Second fastening means 222 are provided at an end of the cylindrical body 212. The cylindrical body 212 may be connected to the door shaft 34 via a linkage 44 extending between the second fastening means 222 and the door shaft 34.

In normal operation of the device, i.e. when both the hydraulic actuator 32 and the electromechanical actuator 36 are fully functional, the piston rod 106 of the hydraulic actuator 32 is fully extended when the door 12 is in the closed position and the arm 212 of the electromechanical actuator 36 is fully retracted as seen in FIG. 3. It will be appreciated that, in alternative examples not shown here, the second actuator could be configured to be extended when the door 12 is in the closed position and retracted when the door is in the open position. Similarly, in examples where the first actuator comprises a linear electromechanical actuator, the first actuator could be configured to be retracted when the door 12 is in the closed position and extended when the door is in the open position.

As the door begins to open, the arm of the electromechanical actuator is allowed to extend so as to follow the rotation of the door shaft 34 without exerting any force thereon. The opening movement or rotation of the door 12 will cause the piston rod 106 of the hydraulic actuator 32 to be pushed inwardly into the first cylinder 102. The hydraulic fluid will thus be forced through the choke valve 116 causing a reaction force acting against the movement of the piston to damp the rotation of the door shaft 34, thus controlling the speed of movement thereof. At the same time, the action of the hydraulic fluid being pushed into the second cylinder 130 will cause the gas therein to be pressurised, thus storing potential energy from the weight of the door 12 whilst opening.

The door shaft will continue to rotate until the door is in the fully open position as shown in FIG. 4. When in the fully open position, the piston rod 106 of the hydraulic actuator 32 is fully retracted and the arm 212 of the electromechanical actuator 36 is fully extended.

To close the door 12 under normal operating conditions, the electromechanical actuator 36 is activated to retract the arm 212, thus pulling the linkage 44 back and causing the door shaft to rotate the door back to its closed position. The rotation of the door shaft 34 will cause the piston rod 106 of the hydraulic actuator 32 to be pulled towards the extended position, the stored potential energy from the pressurised gas acting to push against the piston 104 such that work is applied by the piston rod 106 to move it toward the extended position and to aid in closing the door 12.

Figure 7:
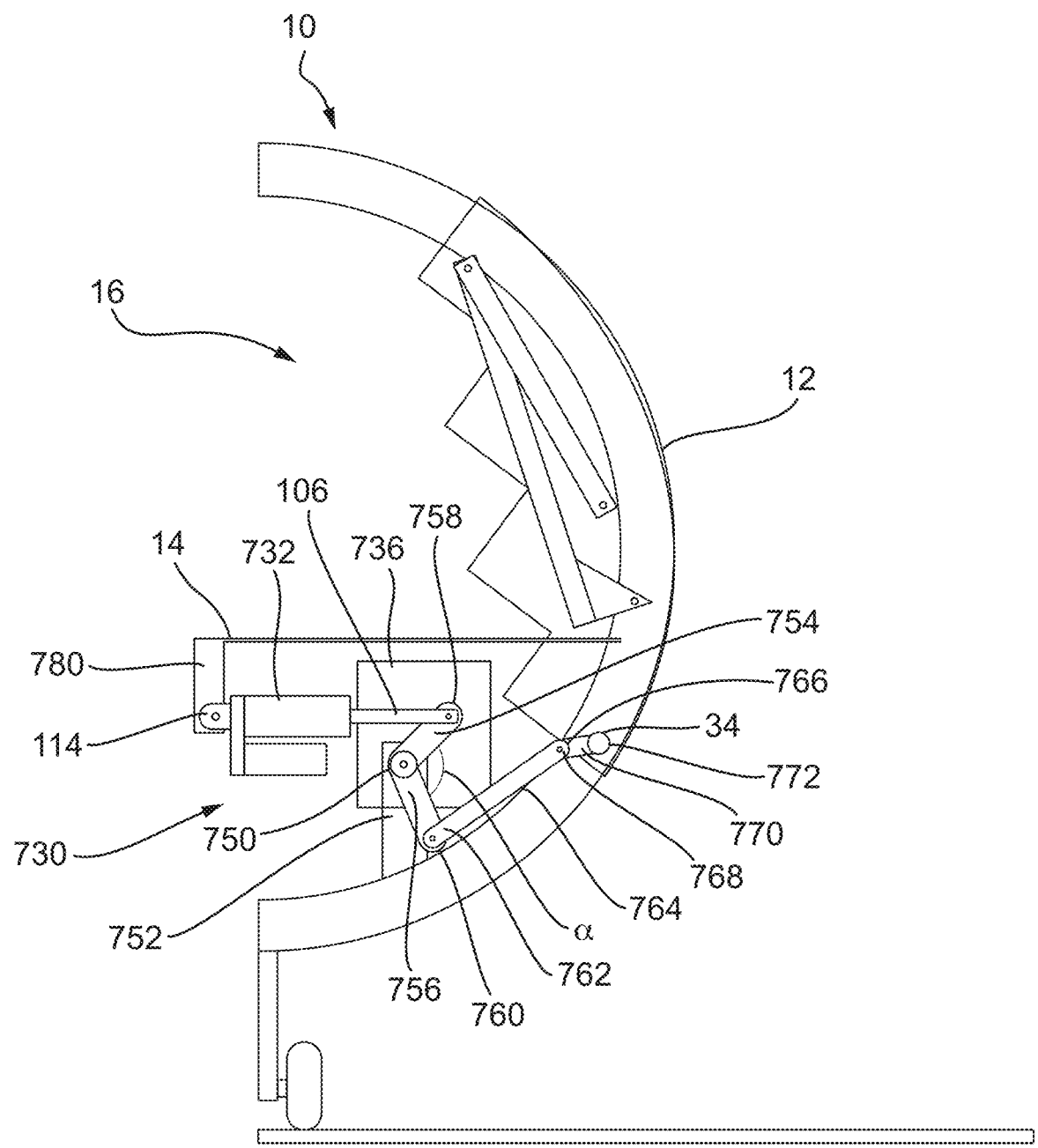
FIG. 7 shows a schematic cross section through part of an aircraft and aircraft door including an alternative device according to the disclosure.

An alternative device according to the disclosure is shown in FIG. 7. Where components correspond to those already described in relation to the example of FIGS. 1 to 4, the same reference numbers are used in FIG. 7 and no further description is provided.

As in FIGS. 1 to 4, a door 12 (shown here in the closed position) is provided in an opening (not shown) in the aircraft fuselage 10.

A device 730 for assisting the opening and closing of the aircraft door 12 is provided. As shown, the device 730 may be provided under the floor 14 of the aircraft cabin 16.

The device 730 again comprises two actuators which may function independently of each other. In the example shown, the device 730 comprises a first actuator 732, linked to a drive shaft 750 at a first distance along the drive shaft 750 and a second actuator 736, linked to the drive shaft 750 at a second distance along the drive shaft 750, spaced along the drive shaft 750 from the first actuator 732. The second actuator 736 comprises a rotary electromechanical actuator 736 and the drive shaft 750 may be in line with the rotational axis (not shown) of the rotary electromechanical actuator 736. Thus, the rotary electromechanical actuator 736 may be provided at a first end of the drive shaft 750 and adapted to drive rotation of the drive shaft 750. The first actuator 732 may take the same form as and have all the features of the hydraulic actuator 32 shown and described above in relation to FIG. 5.

The drive shaft 750 is configured to rotate about a longitudinal axis thereof (not shown). As seen in FIG. 7, the piston 106 of the hydraulic actuator 732 is connected to the drive shaft 750 via an actuator crank 752. The actuator crank 752 may comprise a first arm 754. A first end 758 of the first arm 754 may be pivotally attached to the piston 106 of the hydraulic actuator 732. The second opposite end of the first arm 754 is fixed to a second arm 756 at a first end thereof, such that the first arm 754 extends at a fixed angle α to the second arm 756. In the example shown, the angle α is between 90° and 110°, but it will be appreciated that any suitable actuator crank arrangement may be used.

The actuator crank 752 is pivotally connected to the drive shaft 750 at the junction between the first 754 and second 756 arms thereof. A second end 760 of the second arm 756 is pivotally connected to a first end 762 of a rod 764. The second, opposite end 766 of the rod 764 is pivotally attached to a first end 768 of a door crank 770, and the second end 772 of the door crank 770 is attached the door shaft 34 so as to rotate therewith. Thus, the hydraulic actuator 732 is linked to the door shaft 34 and able to control the speed of rotation of the door shaft 34 and the speed of movement of the door in a manner similar to that described above in relation to the example of FIGS. 1 to 4.

As seen in FIG. 7 and in a similar manner to the example of FIGS. 1 to 4, the hydraulic actuator 732 also comprises first fixing means 114 for fixing the hydraulic actuator 732 to a part of the aircraft structure. In the example shown, the hydraulic actuator 732 is fixed to a structure 780 below the floor 14 of the aircraft cabin 16.

The rotary electromechanical actuator 736 may also be fixed to a structure of the aircraft. In the example shown, the rotary electromechanical actuator 736 is connected directly to the drive shaft 750. By driving rotation of the drive shaft 750, the rotary electromechanical actuator 736 will cause the crank arm 752 to rotate, and so is able to drive rotation of the door shaft 34 and to control the speed of movement of the door in either direction via the drive shaft 750.

The device 730 may further comprise a controller (not shown).

To open the aircraft door 12, the door is released and will then open outwardly under its own weight as in the example of FIGS. 1 to 4. In normal operation, the rotary electromechanical actuator 736 may be used to control the speed of movement of the door 12 (or to damp the movement of the door) while it is opening.

The device 730 according to this example of the disclosure may provide additional safety in the event of a failure of either the hydraulic actuator 732 or the electromechanical actuator 736. In the event that the electromechanical actuator 736 fails either before or during opening of the door 12, the controller may receive notification of the failure. The hydraulic actuator 732 may be sized to sufficiently control the speed of rotation or movement of the door when acting independently of and without the electromechanical actuator 736. Thus, the door 12 may be opened safely and at a controlled speed due to the action of the hydraulic actuator 732 when the electromechanical actuator 736 is not operational due to a failure thereof.

The device 730 according to the disclosure may also provide additional safety in the event of a failure of either the hydraulic actuator 32 or the electromechanical actuator 736 when the door 12 is already open. In one example, in the event that the hydraulic actuator 732 has failed, the door 12 will remain open when an operator attempts to close the door. The electromechanical actuator 736 will detect an overload when activated to lift the door 12 due to a lack of assistance from the gas spring mechanism of the hydraulic actuator 732. Thus, the door 12 will remain open, indicating to personnel that there is a fault. In an alternative example, the electromechanical actuator 736 could be sized to reclose the door 12 alone, for example with a reclosing time increased by 2 or 3 times compared to the closing time in normal operating conditions.

In the event that the electromechanical actuator 736 has failed, the door 12 will remain open when an operator attempts to close the door. The hydraulic actuator 732 is not sized to be capable of lifting the door 12 independently of the electromechanical actuator 736. Thus the door will remain open, indicating to personnel that there is a fault.

As an additional or alternative means of detecting a failure, which is applicable to any example of the disclosure including a pneumatic or hydraulic actuator, a pressure switch or pressure transducer (not shown) may be provided to monitor the pressure of the fluid within the pneumatic or hydraulic actuator and to indicate a failure of the pneumatic or hydraulic actuator if the pressure of the fluid falls below a desired minimum value. Additionally, the pressure of gas in the accumulator could be monitored to indicate a failure of the accumulator if the pressure of the gas falls below a desired minimum value While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure.

For example, it will be understood that any desired combination of actuators could be used in addition to those shown in the examples discussed above. For example, a device according to the disclosure could be provided having two electromechanical actuators such as two linear electromechanical actuators, two rotary electromechanical actuators or with a pneumatic actuator in place of the hydraulic actuator of the examples.

Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A device for assisting the opening and closing of a door in a structure, the device comprising:
    a door shaft configured to rotate about a longitudinal axis thereof in a first direction and in a second opposite direction,
    and configured to be mounted to the structure to form a hinge about which the door may rotate in both the first and second directions relative to the structure;
    a first actuator linked to the door shaft and configured to control a speed of rotation of the door shaft in the first direction; and
    a second actuator linked to the door shaft and configured to drive rotation of the door shaft in the second direction, wherein the second actuator is an electromechanical actuator;
    a controller adapted to control the second actuator to control the speed of rotation of the door shaft;
    a sensor for sensing the extent of rotation of the door, the controller being adapted to control the second actuator to change the speed of rotation of the door shaft based on the sensed extent of rotation of the door shaft;
    wherein the first actuator comprises a hydraulic actuator comprising a damping system for controlling the speed of rotation of the door shaft in the first direction;
    wherein the hydraulic actuator further comprises an accumulator for storing at least one of potential energy of the door and energy generated while the door is moving in the first direction, the accumulator fluidly connected to a first cylinder of the hydraulic actuator and includes a second cylinder, wherein hydraulic fluid is flowed between the first cylinder and the second cylinder.

2. A door comprising:
    the device as claimed in claim 1; and
    a door panel connected to the door shaft for rotation therewith such that the door panel is configured to rotate between an open position and a closed position.

3. The door as claimed in claim 2, wherein the door is an aircraft door and the structure is an aircraft.

4. An aircraft comprising:
    a door as claimed in claim 3; and
    an aircraft body having an opening housing the door;
    wherein the first actuator and the second actuator are fixed to the aircraft body, and
    wherein rotation of the door shaft causes the door to move between a closed position in which it closes the opening and an open position in which the opening is not closed by the door.

5. The aircraft as claimed in claim 4, further comprising:
    a floor within the body;
    wherein the device is located under the floor in the aircraft.

6. The door as claimed in claim 2, wherein the weight of the door acts to rotate the door shaft in the first direction.

7. The door as claimed in claim 6, wherein:
    the device is adapted to activate or control the second actuator to control the speed of movement of the door towards the end of its travel in the first direction, or
    the device is adapted to control the second actuator to control the speed of movement of the door towards the end of its travel in the second direction.

8. The door as claimed in claim 2, wherein:
    the device is adapted to activate or control the second actuator to control the speed of movement of the door towards the end of its travel in the first direction, or
    the device is adapted to control the second actuator to control the speed of movement of the door towards the end of its travel in the second direction.

9. The device as claimed in claim 1, wherein the second actuator is further configured to control the speed of rotation of the door shaft in the first direction.

10. The device as claimed in claim 9, wherein one of the first actuator and the second actuator will function to control the speed of rotation of the door shaft in the first direction in the event of a failure of the other of the first actuator and the second actuator.

11. The device as claimed in claim 1, wherein the second actuator comprises a linear electromechanical actuator or a rotary electromechanical actuator.

12. The device as claimed in claim 1, wherein the hydraulic actuator is configured to assist in driving rotation of the door shaft in the second direction using the energy stored by the accumulator.

\* \* \* \* \*